US012650217B2

(12) United States Patent
Lu et al.

(10) Patent No.: US 12,650,217 B2
(45) Date of Patent: Jun. 9, 2026

(54) LIGHTING DEVICE WITH A ROTATABLE SUSPENSION STRUCTURE

(71) Applicant: Shinegrow (Xiamen) Lighting Technology Co., LTD., Fujian (CN)

(72) Inventors: Fuxing Lu, Fujian (CN); Weibiao Zhong, Fujian (CN)

(73) Assignee: Shinegrow (Xiamen) Lighting Technology Co., LTD., Xiamen (CN)

( * ) Notice: Subject to any disclaimer, the term of this patent is extended or adjusted under 35 U.S.C. 154(b) by 149 days.

(21) Appl. No.: 18/909,962

(22) Filed: Oct. 9, 2024

(65) Prior Publication Data

US 2025/0122994 A1    Apr. 17, 2025

(30) Foreign Application Priority Data

Oct. 17, 2023    (CN) .......................... 202311340878.5

(51) Int. Cl.
*F21V 21/14*          (2006.01)
*E04B 9/00*           (2006.01)
(Continued)

(52) U.S. Cl.
CPC .............. *F21V 21/14* (2013.01); *F21S 8/061* (2013.01); *F21V 21/008* (2013.01);
(Continued)

(58) Field of Classification Search
CPC ...... F21V 21/008; F21V 21/025; F21V 21/03; F21V 21/088; F21V 21/112; F21V 21/16;
(Continued)

(56) References Cited

U.S. PATENT DOCUMENTS 3,589,660 A * 6/1971 Dunckel ................. F21V 21/02
                                                        52/39
5,335,890 A * 8/1994 Pryor ..................... A47H 15/02
                                                       248/343
(Continued)

FOREIGN PATENT DOCUMENTS

CN          106524012 A * 3/2017  .............. F21S 8/061
CN          106545804 A * 3/2017  .............. F21V 29/89
(Continued)

OTHER PUBLICATIONS

Machine translation of DE 102010028332 A1 retrieved from the FIT database of PE2E search. (Year: 2025).*

(Continued)

*Primary Examiner* — Colin J Cattanach
(74) *Attorney, Agent, or Firm* — Bruce Stone LLP; Joseph A. Bruce

(57)          ABSTRACT
A lighting device includes a suspension structure and a light tube. The suspension structure includes a flat plate member, a clamp member, and a fixing member. The flat plate member has a first hole disposed at one end of the flat plate member. The clamp member is disposed on one side of the flat plate member, and includes a main body and two wing portions respectively disposed at two ends of the main body. The main body has a rotation hole, and each of the wing portions has a bent portion. The fixing member passes through the rotation hole and the first hole, such that the clamp member is rotatably fixed to the flat plate member. The light tube includes a tube body having two grooves. The bent portions of the wing portions are embedded in the grooves respectively.

10 Claims, 6 Drawing Sheets

(51) Int. Cl.

| | |
|---|---|
| *F16B 19/10* | (2006.01) |
| *F21K 9/27* | (2016.01) |
| *F21K 9/272* | (2016.01) |
| *F21K 9/275* | (2016.01) |
| *F21K 9/278* | (2016.01) |
| *F21S 4/20* | (2016.01) |
| *F21S 4/28* | (2016.01) |
| *F21S 8/06* | (2006.01) |
| *F21V 17/08* | (2006.01) |
| *F21V 17/16* | (2006.01) |
| *F21V 19/00* | (2006.01) |
| *F21V 21/008* | (2006.01) |
| *F21V 21/02* | (2006.01) |
| *F21V 21/088* | (2006.01) |
| *F21V 21/112* | (2006.01) |
| *F21V 21/16* | (2006.01) |
| *F21V 21/30* | (2006.01) |
| *F21Y 103/00* | (2016.01) |
| *F16B 5/06* | (2006.01) |
| *F21V 21/03* | (2006.01) |

(52) U.S. Cl.
CPC ............. *F21V 21/112* (2013.01); *E04B 9/006* (2013.01); *F16B 5/0621* (2013.01); *F16B 19/1081* (2013.01); *F21K 9/27* (2016.08); *F21K 9/272* (2016.08); *F21K 9/275* (2016.08); *F21K 9/278* (2016.08); *F21S 4/20* (2016.01); *F21S 4/28* (2016.01); *F21S 8/06* (2013.01); *F21S 8/063* (2013.01); *F21S 8/066* (2013.01); *F21S 8/068* (2013.01); *F21V 17/08* (2013.01); *F21V 17/16* (2013.01); *F21V 17/164* (2013.01); *F21V 19/004* (2013.01); *F21V 19/0075* (2013.01); *F21V 19/008* (2013.01); *F21V 21/025* (2013.01); *F21V 21/03* (2013.01); *F21V 21/088* (2013.01); *F21V 21/16* (2013.01); *F21V 21/30* (2013.01); *F21Y 2103/00* (2013.01)

(58) Field of Classification Search
CPC .... F21V 19/004; F21V 19/0075; F21V 17/08; F21V 17/16; F21S 8/06; F21S 8/061; F21S 8/063; F21S 8/066; F21S 4/20; F21K 9/27; F21K 9/272; F21K 9/275
See application file for complete search history.

(56) References Cited

U.S. PATENT DOCUMENTS

| | | | |
|---|---|---|---|
| 11,519,551 B1 * | 12/2022 | Derman | ................. F16M 11/08 |
| 2014/0182090 A1 * | 7/2014 | Chen | ......................... F16B 7/22 |
| | | | 24/369 |
| 2018/0172898 A1 * | 6/2018 | Blessitt | ............... G02B 6/0091 |

FOREIGN PATENT DOCUMENTS

| | | | | |
|---|---|---|---|---|
| DE | 10341550 A1 * | 3/2005 | ............. | F16G 11/04 |
| DE | 102010028332 A1 * | 12/2011 | ............ | F21V 21/112 |

OTHER PUBLICATIONS

Machine translation of DE 10341550 A1 retrieved from the FIT database of PE2E search. (Year: 2025).*
Machine translation of CN 106545804 A retrieved from the FIT database of PE2E search. (Year: 2025).*
Machine translation of CN 106524012 A retrieved from the FIT database of PE2E search. (Year: 2025).*

* cited by examiner

LIGHTING DEVICE WITH A ROTATABLE SUSPENSION STRUCTURE

BACKGROUND OF THE INVENTION

1. Field of the Invention

The present invention relates to a lighting device, in particular to a lighting device with a rotatable suspension structure.

2. Description of the Prior Art

Lighting devices can provide sufficient light, thereby improving the safety of the environment and enhancing people's work efficiency and productivity. With the development of light-emitting diode (LED) technology, the performance of LED lighting devices has been significantly improved, enabling better lighting effects with less energy, which helps to reduce energy consumption and carbon emissions. Lighting devices play an important role in real life because these devices can meet various needs. These needs may vary according to different applications. In addition to different applications, sometimes users need the lighting directions of the lighting devices within the same building to change. However, since currently available lighting devices lack a structural design that allows for adjusting the lighting direction, these devices cannot adjust the lighting directions thereof to meet the needs of different applications. Therefore, how to propose a lighting device to overcome the shortcomings of currently available technology has become an urgent issue.

SUMMARY OF THE INVENTION

One embodiment of the present invention provides a lighting device with a rotatable suspension structure, which includes a suspension structure and a light tube. The suspension structure includes a flat plate member, a clamp member, and a fixing member. The flat plate member has a first hole disposed at one end of the flat plate member. The clamp member is disposed on one side of the flat plate member, and includes a main body and two wing portions respectively disposed at two ends of the main body. The main body has a rotation hole, and each of the wing portions has a bent portion. The fixing member passes through the rotation hole and the first hole, such that the clamp member is rotatably fixed to the flat plate member. The light tube includes a tube body having two grooves. The bent portion of one of the wing portions is embedded in one of the grooves, and the bent portion of the other of the wing portions is embedded in the other of the grooves.

In one embodiment, the suspension structure further includes a rotation shaft washer disposed in the first hole and has a central hole. The fixing member passes through the central hole.

In one embodiment, the main body further has two force adjusting portions disposed on one side of the main body so as to push against the tube body.

In one embodiment, the distance between any one of the force adjusting portions and the wing portion adjacent thereto is less than the distance between the force adjusting portions.

In one embodiment, the force adjusting portions are trapezoidal.

In one embodiment, the fixing member comprises a central shaft and two fixing cover plates.

In one embodiment, the flat plate member further has a second hole disposed at another end of the flat plate member.

In one embodiment, the lighting device further has a suspension rope. One end of the suspension rope is fixed to the second hole.

In one embodiment, the second hole is elliptical, circular, or rectangular.

In one embodiment, the light tube further includes two end caps disposed at the two ends of the tube body.

The lighting device with the rotatable suspension structure in accordance with the embodiments of the present invention may have the following advantages:

(1) In one embodiment of the present invention, the lighting device includes a suspension structure and a light tube. The suspension structure includes a flat plate member, a clamp member, and a fixing member. The flat plate member has a first hole disposed at one end of the flat plate member. The clamp member is disposed on one side of the flat plate member, and includes a main body and two wing portions respectively disposed at two ends of the main body. The main body has a rotation hole, and each of the wing portions has a bent portion. The fixing member passes through the rotation hole and the first hole, such that the clamp member is rotatably fixed to the flat plate member. The light tube includes a tube body having two grooves. The bent portion of one of the wing portions is embedded in one of the grooves, and the bent portion of the other of the wing portions is embedded in the other of the grooves. The aforementioned rotatable suspension structure can achieve various suspension modes, such as double-rope horizontal installation mode, single-rope horizontal installation mode, and single-rope vertical installation mode. The lighting device can rotate to adjust the lighting direction thereof so as to meet the lighting needs of different applications. Therefore, the lighting device can provide a versatile lighting solution.

(2) In one embodiment of the present invention, the lighting device has a special rotatable suspension structure, which can be applied to places with a considerable distance between the ceiling and the ground (such as indoor farms, outdoor tents, etc.), to meet the lighting needs of these places. Therefore, the lighting device is indeed more widely applicable and more flexible in use, so the lighting device can meet actual requirements.

(3) In one embodiment of the present invention, the rotatable suspension structure of the lighting device can have two clamp members, allowing two light tubes to be respectively installed on the two clamp members, achieving a wide-angle lighting function. Therefore, the lighting device is very suitable for applications requiring wide-angle lighting functions, such as indoor farms, to effectively promote plant growth.

(4) In one embodiment of the present invention, the main body of the clamp member of the rotatable suspension structure of the lighting device further has two force adjusting portions. These two force adjusting portions are disposed on one side of the main body in order to push against the tube body of the light tube. The above-mentioned force adjusting structure pushes against the tube body through the two force adjusting portions, which not only prevents the tube body from contacting the fixing member but also increases the friction between the bent portions of the wing portions and the grooves of the tube body. Therefore, the force adjusting structure design can effectively enhance the overall structural stability of the lighting device.

(5) In one embodiment of the present invention, the design of the lighting device is simple, so the lighting device can achieve the desired effect without significantly increasing the cost thereof. Therefore, the lighting device can achieve higher practicality to meet the needs of different users.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
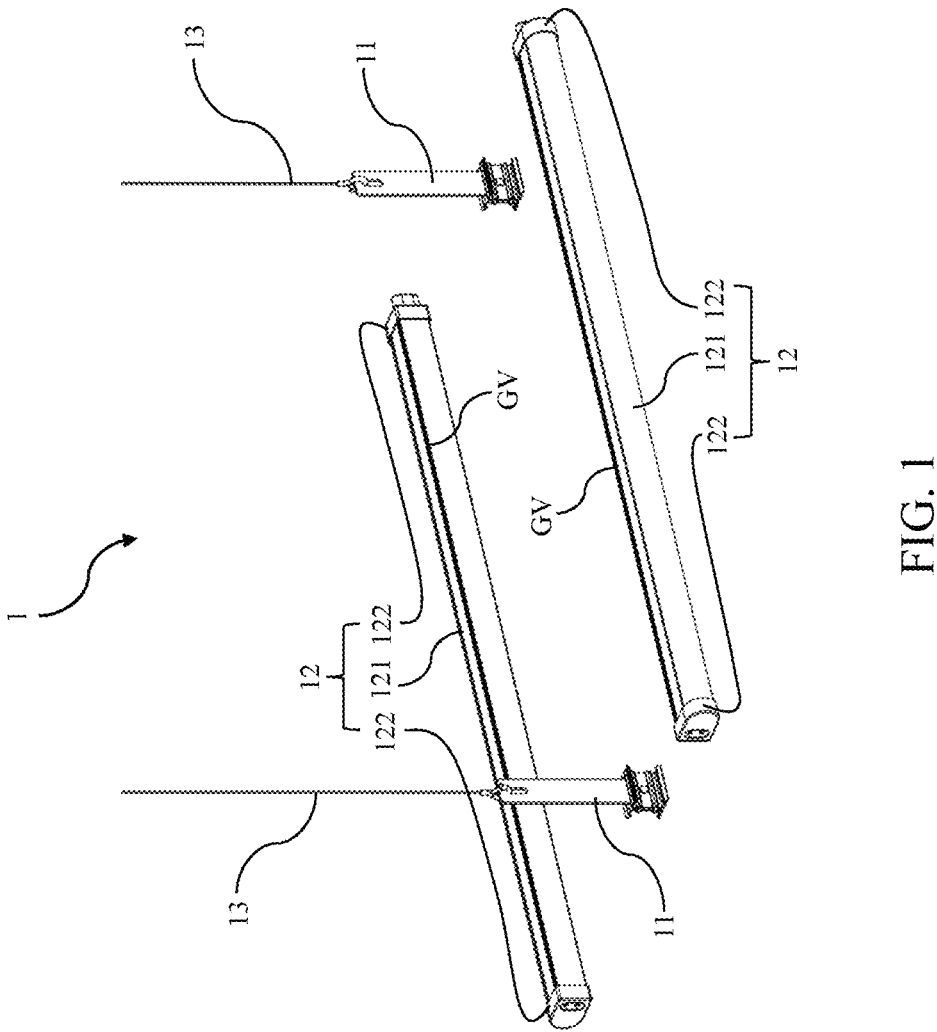
FIG. 1 is the exploded view of a lighting device with a rotatable suspension structure in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
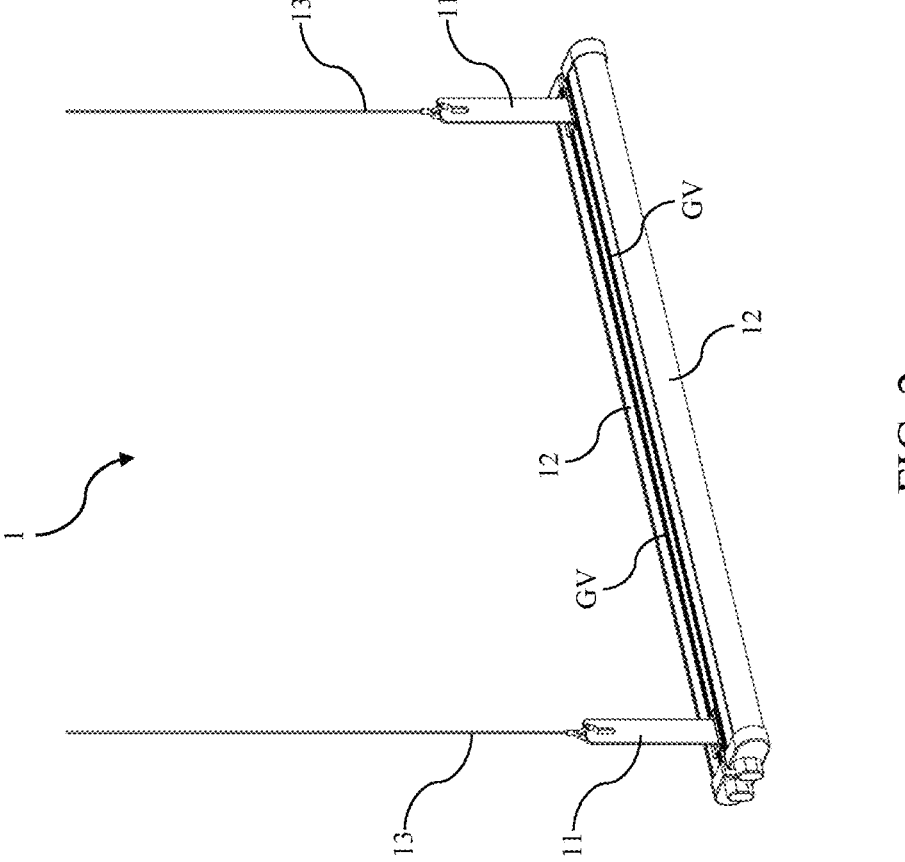
FIG. 2 is the perspective view of the lighting device with the rotatable suspension structure in accordance with one embodiment of the present invention.

Please refer to FIG. 1 and FIG. 2. FIG. 1 is the exploded view of a lighting device with a rotatable suspension structure in accordance with one embodiment of the present invention. FIG. 2 is the perspective view of the lighting device with the rotatable suspension structure in accordance with one embodiment of the present invention. As shown in FIG. 1 and FIG. 2, the lighting device 1 includes two suspension structures 11, two light tubes 12, and two suspension ropes 13. The light tube 12 further includes a tube body 121 and two end caps 122. Both sides of the tube body 121 have two grooves GV respectively. The number of suspension structures 11, light tubes 12, and suspension ropes 13 can be adjusted according to actual needs.

The embodiment just exemplifies the present invention and is not intended to limit the scope of the present invention; any equivalent modification and variation according to the spirit of the present invention is to be also included within the scope of the following claims and their equivalents.

Figure 3:
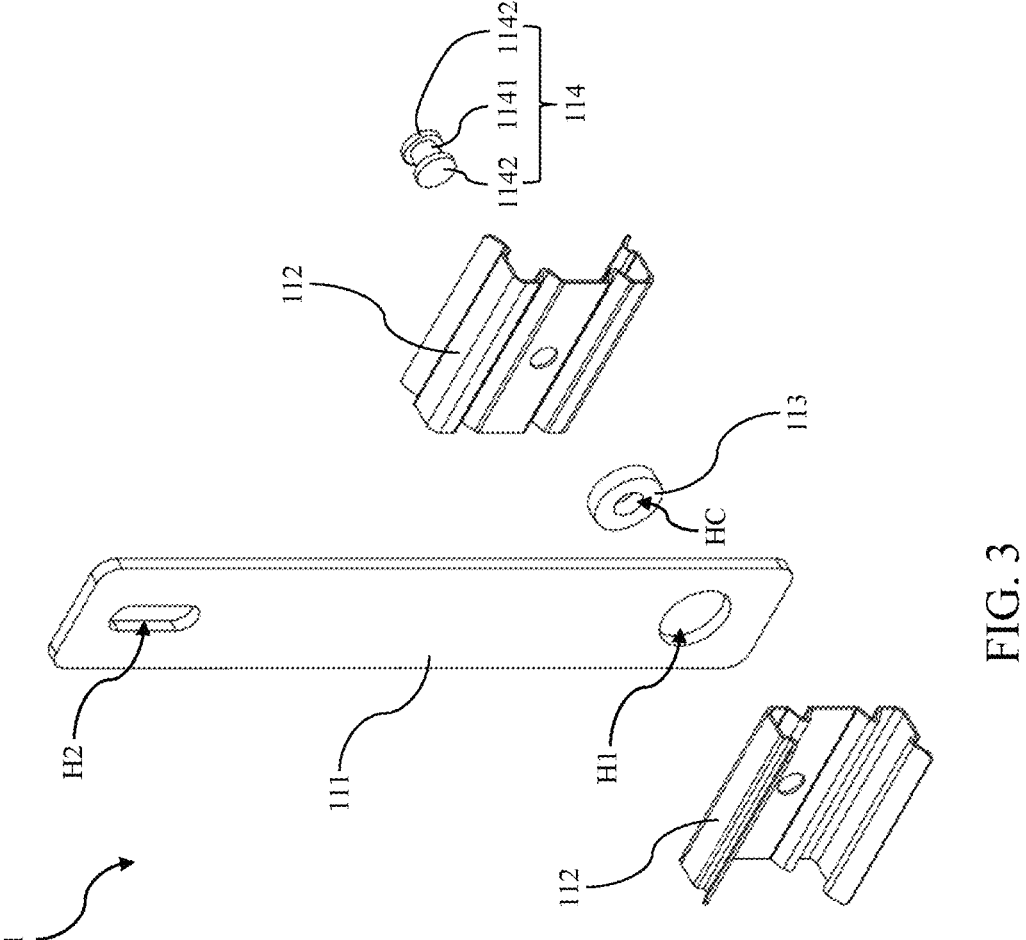
FIG. 3 is the exploded view of the suspension structure of the lighting device with the rotatable suspension structure in accordance with one embodiment of the present invention.
Figure 4:
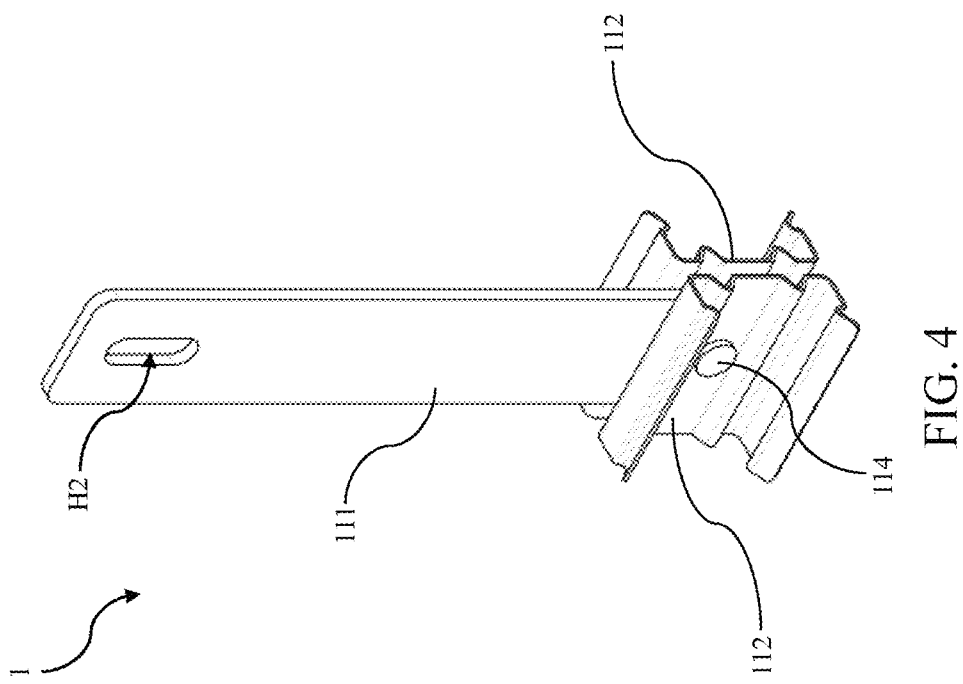
FIG. 4 is the perspective view of the suspension structure of the lighting device with the rotatable suspension structure in accordance with one embodiment of the present invention.
Figure 5:
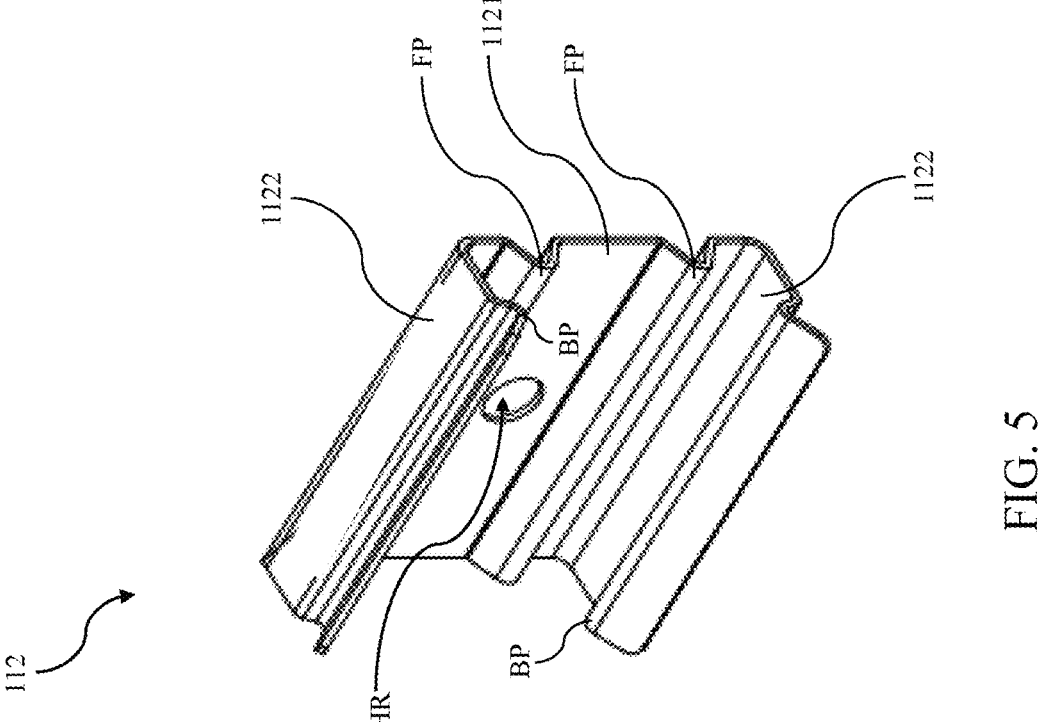
FIG. 5 is the exploded view of the clamp member of the suspension structure of the lighting device with the rotatable suspension structure in accordance with one embodiment of the present invention.

Please refer to FIG. 3, FIG. 4, and FIG. 5; please also refer to FIG. 1 and FIG. 2. FIG. 3 is the exploded view of the suspension structure of the lighting device with the rotatable suspension structure in accordance with one embodiment of the present invention. FIG. 4 is the perspective view of the suspension structure of the lighting device with h the rotatable suspension structure in accordance with one embodiment of the present invention. FIG. 5 is the exploded view of the clamp member of the suspension structure of the lighting device with the rotatable suspension structure in accordance with one embodiment of the present invention. As shown in FIG. 3, FIG. 4, and FIG. 5, the suspension structure 11 includes a flat plate member 111, two clamp members 112, a rotation axle ring 113, and a fixing member 114.

The flat plate member 111 has a first hole H1 disposed at one end thereof and a second hole H2 disposed at the other end thereof. One end of the suspension rope 13 is fixed to the second hole H2, while the other end of the suspension rope 13 is fixed to the ceiling of a building or the top of a tent. In one embodiment, the first hole H1 can be circular. In one embodiment, the second hole H2 can be elliptical. In another embodiment, the second hole H2 can be rectangular or circular; the shape of the second hole H2 can vary according to actual needs.

The two clamp members 112 are respectively provided on the two sides of the flat plate member 111. Each clamp member 112 includes a main body 1121 and two wing portions 1122 respectively disposed at the two ends of the main body 1121. The main body 1121 has a rotation hole HR and two force adjusting portions FP. The two force adjusting portions FP are provided on one side of the main body 1121. The distance between any force adjusting portion FP and the adjacent wing portion 1122 is less than the distance between the two force adjusting portions FP. In one embodiment, the force adjusting portions FP are trapezoidal. Each wing portion 1122 has a bent portion BP, with the bent portion BP of one of the two wing portions 1122 is opposite to the bent portion BP of the other of the two wing portions 1122.

The fixing member 114 includes a central shaft 1141 and two fixing cover plates 1142. The two fixing cover plates 1142 are connected to each other through the central shaft 1141.

The rotation axle ring 113 is disposed in the first hole H1 and has a central hole HC.

The fixing member 114 passes through the rotation holes HR of the main bodies 1121 of the two clamp members 112 and the central hole HC of the rotation axle ring 113 of the first hole H1. In this way, the two clamp members 112 can be rotatably fixed to the flat plate member 111. The bent portion BP of one of the wing portions 1122 of the clamp member 112 can be embedded in the groove GV on one side of the tube body 121 of the light tube 12, while the bent portion BP of the other of the wing portions 1122 of the clamp member 112 can be embedded in the groove on the other side of the tube body 121 of the light tube 12. Thus, the two light tubes 12 can be fixed to the two clamp members 112.

Due to the structural design of the suspension structure 11, the two clamp members 112 can rotate around the fixing member 114. Therefore, this rotatable suspension structure 11 can achieve various suspension modes, such as the double-rope horizontal installation mode (in this embodiment), the single-rope horizontal installation mode, and the single-rope vertical installation mode. The lighting device 1 can rotate to adjust the lighting direction thereof in order to meet the lighting needs of different applications. Therefore, the lighting device 1 can provide a versatile lighting solution.

In addition, the rotatable suspension structure 11 of the lighting device 1 can have two clamp members 112, such that the two light tubes 12 can be respectively installed on the two clamp members 112 in order to achieve a wide-angle lighting function. Therefore, the lighting device 1 is very suitable for applications requiring wide-angle lighting functions, such as indoor farms, to effectively promote plant growth.

Furthermore, the main body 1121 of the clamp member 112 of the rotatable suspension structure 11 of the lighting device 1 also has two force adjusting portions FP. These two force adjusting portions FP are disposed on one side of the main body 1121 and push against the tube body 121 of the light tube 12. The aforementioned force adjusting structure pushes against the tube body 121 of the light tube 12 through the two force adjusting portions FP. Thus, the tube body 121 can be kept at a distance from the main body 1121 of the clamp member 112 (equal to the height of the force adjusting portion FP) to prevent the tube body 121 from contacting the fixing member 114. Meanwhile, the two force adjusting portions FP push the tube body 121 away from the main body 1121 of the clamp member 112, thereby increasing the friction between the bent portions BP of the wing portions 1121 and the grooves GV of the tube body 121. Therefore, the design of the force adjusting structure can effectively enhance the overall structural stability of the lighting device 1.

Due to the special rotatable suspension structure of the lighting device 1, the lighting device 1 can be applied to places with a considerable distance between the ceiling and the ground (such as indoor farms, outdoor tents, etc.), to meet the lighting needs of these places. Therefore, the lighting device 1 is indeed more widely applicable and more flexible in use, meeting practical application requirements.

The embodiment just exemplifies the present invention and is not intended to limit the scope of the present invention; any equivalent modification and variation according to the spirit of the present invention is to be also included within the scope of the following claims and their equivalents.

It is worthy to point out that currently available lighting devices lack a structural design that allows for adjusting the lighting direction, so these devices cannot adjust the lighting directions thereof to meet the needs of different applications. By contrast, according to one embodiment of the present invention, the lighting device includes a suspension structure and a light tube. The suspension structure includes a flat plate member, a clamp member, and a fixing member. The flat plate member has a first hole disposed at one end of the flat plate member. The clamp member is disposed on one side of the flat plate member, and includes a main body and two wing portions respectively disposed at two ends of the main body. The main body has a rotation hole, and each of the wing portions has a bent portion. The fixing member passes through the rotation hole and the first hole, such that the clamp member is rotatably fixed to the flat plate member. The light tube includes a tube body having two grooves. The bent portion of one of the wing portions is embedded in one of the grooves, and the bent portion of the other of the wing portions is embedded in the other of the grooves. The aforementioned rotatable suspension structure can achieve various suspension modes, such as double-rope horizontal installation mode, single-rope horizontal installation mode, and single-rope vertical installation mode. The lighting device can rotate to adjust the lighting direction thereof so as to meet the lighting needs of different applications. Therefore, the lighting device can provide a versatile lighting solution.

Also, according to one embodiment of the present invention, the lighting device has a special rotatable suspension structure, which can be applied to places with a considerable distance between the ceiling and the ground (such as indoor farms, outdoor tents, etc.), to meet the lighting needs of these places. Therefore, the lighting device is indeed more widely applicable and more flexible in use, so the lighting device can meet actual requirements.

Further, according to one embodiment of the present invention, the rotatable suspension structure of the lighting device can have two clamp members, allowing two light tubes to be respectively installed on the two clamp members, achieving a wide-angle lighting function. Therefore, the lighting device is very suitable for applications requiring wide-angle lighting functions, such as indoor farms, to effectively promote plant growth.

Moreover, according to one embodiment of the present invention, the main body of the clamp member of the rotatable suspension structure of the lighting device further has two force adjusting portions. These two force adjusting portions are disposed on one side of the main body in order to push against the tube body of the light tube. The above-mentioned force adjusting structure pushes against the tube body through the two force adjusting portions, which not only prevents the tube body from contacting the fixing member but also increases the friction between the bent portions of the wing portions and the grooves of the tube body. Therefore, the force adjusting structure design can effectively enhance the overall structural stability of the lighting device.

Furthermore, according to one embodiment of the present invention, the design of the lighting device is simple, so the lighting device can achieve the desired effect without significantly increasing the cost thereof. Therefore, the lighting device can achieve higher practicality to meet the needs of different users. As described above, the lighting device according to the embodiments of the present invention can definitely achieve great technical effects.

Figure 6:
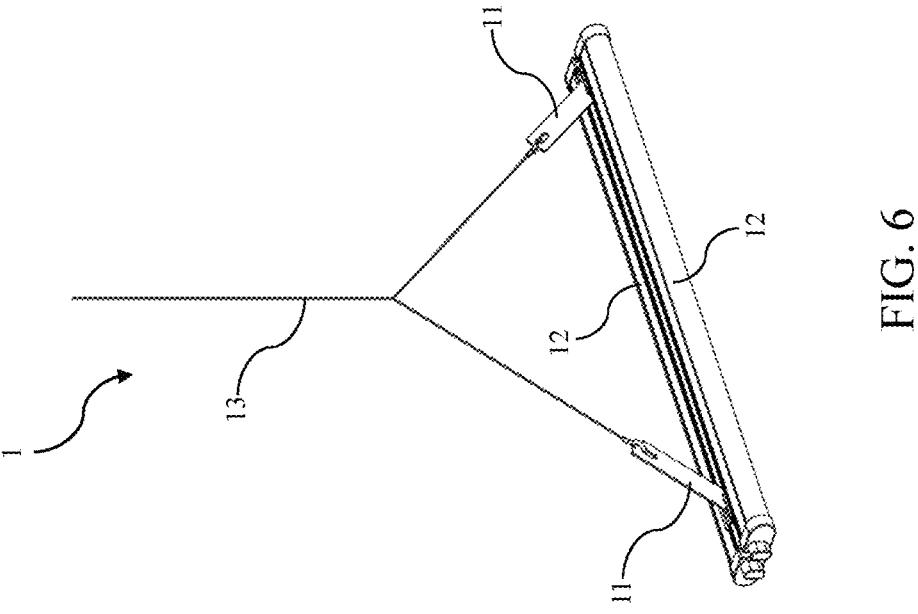
FIG. 6 is the perspective view of a lighting device with a rotatable suspension structure in accordance with another embodiment of the present invention.

Please refer to FIG. 6, which is the perspective view of a lighting device with a rotatable suspension structure in accordance with another embodiment of the present invention; please also refer to FIG. 3, FIG. 4 and FIG. 5. As shown in FIG. 6, the lighting device 1 includes two suspension structures 11, two light tubes 12, and a suspension rope 13.

The suspension structure 11 includes a flat plate member 111, two clamp members 112, a rotation axle ring 113, and a fixing member 114. The flat plate member 111 has a first hole H1 at one end thereof and a second hole H2 at the other end thereof. One end of the suspension rope 13 is fixed to the second hole H2, while the other end of the suspension rope 13 is fixed to the roof of a building or the top of a tent. The two clamp members 112 are respectively disposed on the two sides of the flat plate member 111. Each clamp member 112 includes a main body 1121 and two wing portions 1122 respectively disposed at the two ends of the main body 1121. The main body 1121 has a rotation hole HR and two force adjusting portions FP. The two force adjusting portions FP are disposed on one side of the main body 1121. The distance between any force adjusting portion FP and the adjacent wing portion 1122 is less than the distance between the two force adjusting portions FP. Each wing portion 1122 has a bent portion BP, with the bent portions BP of the two wing portions 1122 positioned opposite each other. The fixing member 114 includes a central shaft 1141 and two fixing cover plates 1142. The two fixing cover plates 1142 are connected to each other via the central shaft 1141. The rotation axle ring 113 is disposed in the first hole H1 and has a central hole HC. The fixing member 114 passes through the rotation holes HR of the main bodies 1121 of the two clamp members 112 and the central hole HC of the rotation axle ring 113 of the first hole H1, such that the two clamp members 112 can be rotatably fixed to the flat plate member 111. The bent portion BP of one of the wing portions 1122 of the clamp member 112 can be embedded in the groove GV on one side of the tube body 121 of the light tube 12, while the bent portion BP of the other of the wing portions 1122 of the clamp member 112 can be embedded in the groove GV on the other side of the tube body 121 of the light tube 12. Thus, the two light tubes 12 can be fixed to the two clamp members 112.

Due to the structural design of the suspension structure 11, the two clamp members 112 can rotate around the fixing member 114. Via this rotatable suspension structure 11, various suspension modes can be achieved. This embodiment is the single-rope horizontal installation mode.

The embodiment just exemplifies the present invention and is not intended to limit the scope of the present invention; any equivalent modification and variation according to the spirit of the present invention is to be also included within the scope of the following claims and their equivalents.

Figure 7:
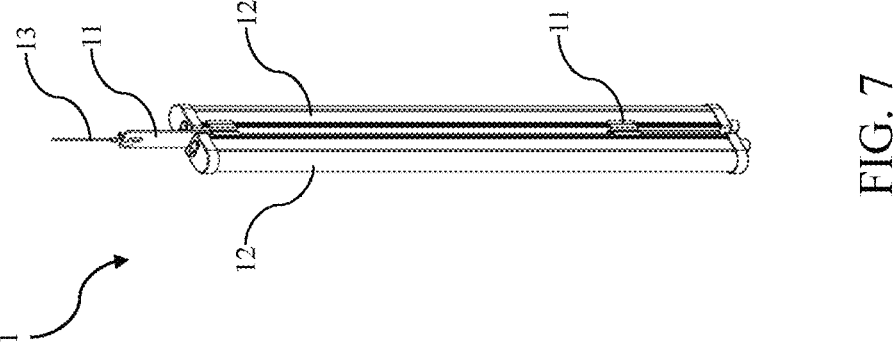
FIG. 7 is the perspective view of a lighting device with a rotatable suspension structure in accordance with still another embodiment of the present invention.

Please refer to FIG. 7, which is the perspective view of a lighting device with a rotatable suspension structure in accordance with still another embodiment of the present invention; please also refer to FIG. 3, FIG. 4 and FIG. 5. As shown in FIG. 7, the lighting device 1 includes two suspension structures 11, two light tubes 12, and a suspension rope 13.

The suspension structure 11 includes a flat plate member 111, two clamp members 112, a rotation axle ring 113, and a fixing member 114. The flat plate member 111 has a first hole H1 at one end thereof and a second hole H2 at the other end thereof. One end of the suspension rope 13 is fixed to the second hole H2, while the other end of the suspension rope 13 is fixed to the roof of a building or the top of a tent. The two clamp members 112 are respectively disposed on the two sides of the flat plate member 111. Each clamp member 112 includes a main body 1121 and two wing portions 1122 respectively disposed at the two ends of the main body 1121. The main body 1121 has a rotation hole HR and two force adjusting portions FP. The two force adjusting portions FP are disposed on one side of the main body 1121. The distance between any force adjusting portion FP and the adjacent wing portion 1122 is less than the distance between the two force adjusting portions FP. Each wing portion 1122 has a bent portion BP, with the bent portions BP of the two wing portions 1122 positioned opposite each other. The fixing member 114 includes a central shaft 1141 and two fixing cover plates 1142. The two fixing cover plates 1142 are connected to each other through the central shaft 1141. The rotation axle ring 113 is provided in the first hole H1 and has a central hole HC. The fixing member 114 passes through the rotation holes HR of the main bodies 1121 of the two clamp members 112 and the central hole HC of the rotation axle ring 113 of the first hole H1, such that the two clamp members 112 can be rotatably fixed to the flat plate member 111. The bent portion BP of one of the wing portions 1122 of the clamp member 112 can be embedded in the groove GV on one side of the tube body 121 of the light tube 12, while the bent portion BP of the other of the wing portions 1122 of the clamp member 112 can be embedded in the groove GV on the other side of the tube body 121 of the light tube 12. Thus, the two light tubes 12 can be fixed to the two clamp members 112.

Via the structural design of the suspension structure 11, the two clamp members 112 can rotate around the fixing member 114. Via this rotatable suspension structure 11, various suspension modes can be achieved. This embodiment is the single-rope vertical installation mode.

Similarly, the rotatable suspension structure 11 of the lighting device 1 can have two clamp members 112, such that the two light tubes 12 can be respectively installed on the two clamp members 112 in order to achieve a wide-angle lighting function. Therefore, the lighting device 1 is very suitable for applications requiring wide-angle lighting functions, such as indoor farms, to effectively promote plant growth.

As previously described, the main body 1121 of the clamp member 112 of the rotatable suspension structure 11 of the lighting device 1 also has two force adjusting portions FP. These two force adjusting portions FP are disposed on one side of the main body 1121 and push against the tube body 121 of the light tube 12. The aforementioned force adjusting structure pushes against the tube body 121 via the two force adjusting portions FP. Thus, the tube body 121 of the light tube 12 can be kept at a distance from the main body 1121 of the clamp member 112 (equal to the height of the force adjusting portion FP) to prevent the tube body 121 from contacting the fixing member 114. Meanwhile, the two force adjusting portions FP push the tube body 121 away from the main body 1121 of the clamp member 112, thereby increasing the friction between the bent portions BP of the wing portions 1122 and the grooves GV of the tube body 121. Therefore, the design of the force adjusting structure can effectively enhance the overall structural stability of the lighting device 1.

Via the special rotatable suspension structure of the lighting device 1, the lighting device 1 can be applied to places with a considerable distance between the ceiling and the ground (such as indoor farms, outdoor tents, etc.), to meet the lighting needs of these places. Therefore, the lighting device 1 is indeed more widely applicable and more flexible in use, meeting practical application requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device includes a suspension structure and a light tube. The suspension structure includes a flat plate member, a clamp member, and a fixing member. The flat plate member has a first hole disposed at one end of the flat plate member. The clamp member is disposed on one side of the flat plate member, and includes a main body and two wing portions respectively disposed at two ends of the main body. The main body has a rotation hole, and each of the wing portions has a bent portion. The fixing member passes through the rotation hole and the first hole, such that the clamp member is rotatably fixed to the flat plate member. The light tube includes a tube body having two grooves. The bent portion of one of the wing portions is embedded in one of the grooves, and the bent portion of the other of the wing portions is embedded in the other of the grooves. The aforementioned rotatable suspension structure can achieve various suspension modes, such as double-rope horizontal installation mode, single-rope horizontal installation mode, and single-rope vertical installation mode. The lighting device can rotate to adjust the lighting direction thereof so as to meet the lighting needs of different applications. Therefore, the lighting device can provide a versatile lighting solution.

Also, according to one embodiment of the present invention, the lighting device has a special rotatable suspension structure, which can be applied to places with a considerable distance between the ceiling and the ground (such as indoor farms, outdoor tents, etc.), to meet the lighting needs of these places. Therefore, the lighting device is indeed more widely applicable and more flexible in use, so the lighting device can meet actual requirements.

Further, according to one embodiment of the present invention, the rotatable suspension structure of the lighting device can have two clamp members, allowing two light tubes to be respectively installed on the two clamp members, achieving a wide-angle lighting function. Therefore, the lighting device is very suitable for applications requiring wide-angle lighting functions, such as indoor farms, to effectively promote plant growth.

Moreover, according to one embodiment of the present invention, the main body of the clamp member of the rotatable suspension structure of the lighting device further has two force adjusting portions. These two force adjusting portions are disposed on one side of the main body in order to push against the tube body of the light tube. The above-mentioned force adjusting structure pushes against the tube body through the two force adjusting portions, which not only prevents the tube body from contacting the fixing member but also increases the friction between the bent portions of the wing portions and the grooves of the tube body. Therefore, the force adjusting structure design can effectively enhance the overall structural stability of the lighting device.

Furthermore, according to one embodiment of the present invention, the design of the lighting device is simple, so the lighting device can achieve the desired effect without significantly increasing the cost thereof. Therefore, the lighting device can achieve higher practicality to meet the needs of different users.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device with a rotatable suspension structure, comprising:

a suspension structure, comprising a flat plate member, two clamp members, and a fixing member, wherein the flat plate member has a first hole disposed at one end of the flat plate member, the clamp members are disposed on two sides of the flat plate member respectively, and each of the two clamp members comprises a main body and two wing portions respectively disposed at two ends of the main body, the main body has a rotation hole, and each of the wing portions has a bent portion, the fixing member passes through the rotation holes and the first hole, whereby the two clamp members are rotatably fixed to the flat plate member; and two light tubes corresponding to the two clamp members, wherein each of the two light tubes comprises a tube body having two grooves, wherein the bent portions of the wing portions of one of the two clamp members are respectively embedded in the two grooves of the tube body of one of the two light tubes, and the bent portions of the wing portions of another of the two clamp members are respectively embedded in the two grooves of the tube body of another of the two light tubes, whereby the two light tubes are respectively secured to the two clamp members in opposite orientations.

2. The lighting device with the rotatable suspension structure as claimed in claim 1, wherein the suspension structure further comprises a rotation shaft washer disposed in the first hole and having a central hole, and the fixing member passes through the central hole.

3. The lighting device with the rotatable suspension structure as claimed in claim 1, wherein the main body of each of the two clamp members further has two force adjusting portions disposed on one side of the main body so as to push against the tube body.

4. The lighting device with the rotatable suspension structure as claimed in claim 3, wherein a distance between any one of the force adjusting portions and the wing portion adjacent thereto is less than a distance between the force adjusting portions.

5. The lighting device with the rotatable suspension structure as claimed in claim 3, wherein the force adjusting portions are trapezoidal.

6. The lighting device with the rotatable suspension structure as claimed in claim 1, wherein the fixing member comprises a central shaft and two fixing cover plates.

7. The lighting device with the rotatable suspension structure as claimed in claim 1, wherein the flat plate member further has a second hole disposed at another end of the flat plate member.

8. The lighting device with a rotatable suspension structure as claimed in claim 7, further comprising a suspension rope, wherein one end of the suspension rope is fixed to the second hole.

9. The lighting device with the rotatable suspension structure as claimed in claim 7, wherein the second hole is elliptical, circular, or rectangular.

10. The lighting device with the rotatable suspension structure as claimed in claim 1, wherein each of the two light tubes further comprises two end caps disposed at two ends of the tube body.

* * * * *